United States Patent
Yang

(10) Patent No.: US 9,195,081 B2
(45) Date of Patent: Nov. 24, 2015

(54) TOUCH LIQUID CRYSTAL GRATING, 3D TOUCH DISPLAY DEVICE AND DRIVING METHOD OF TOUCH LIQUID CRYSTAL GRATING

(71) Applicant: BEIJING BOE OPTOELECTRONICS TECHNOLOGY CO., LTD., Beijing (CN)

(72) Inventor: Shengji Yang, Beijing (CN)

(73) Assignee: BEIJING BOE OPTOELECTRONICS TECHNOLOGIES CO., LTD., Beijing (CN)

( * ) Notice: Subject to any disclaimer, the term of this patent is extended or adjusted under 35 U.S.C. 154(b) by 121 days.

(21) Appl. No.: 14/014,575

(22) Filed: Aug. 30, 2013

(65) Prior Publication Data

US 2014/0063385 A1    Mar. 6, 2014

(30) Foreign Application Priority Data

Aug. 31, 2012  (CN) .......................... 2012 1 0320605

(51) Int. Cl.
*G06F 3/041* (2006.01)
*G02F 1/1333* (2006.01)
(Continued)

(52) U.S. Cl.
CPC .......... *G02F 1/1313* (2013.01); *G02B 27/2214* (2013.01); *G02F 1/13338* (2013.01); *G06F 3/044* (2013.01); *G06F 3/0412* (2013.01); *H04N 13/0409* (2013.01); *G02F 1/134363* (2013.01)

(58) Field of Classification Search
CPC ............ G02F 1/13338; G02B 27/2214; G06F 3/0412; G06F 3/041; H04N 13/0409
See application file for complete search history.

(56) References Cited

U.S. PATENT DOCUMENTS

2006/0197725 A1*  9/2006  Nam et al. ....................... 345/87
2008/0218459 A1*  9/2008  Kim et al. ........................ 345/87
(Continued)

FOREIGN PATENT DOCUMENTS

CN          202837756 U      3/2013

OTHER PUBLICATIONS

Extended European Search Report dated Aug. 1, 2014; Appln, No. 13182402.1-1904.
(Continued)

*Primary Examiner* — Michael Caley
*Assistant Examiner* — Jia Pan
(74) *Attorney, Agent, or Firm* — Ladas & Parry LLP

(57) ABSTRACT

An embodiment of the present invention discloses a touch liquid crystal grating, its driving method and a 3D touch display device. The touch liquid crystal grating comprises: a first substrate and a second substrate; a liquid crystal layer; grating electrodes, located on a side of the first substrate facing the liquid crystal layer and extend along a first direction, each being located within each of strip-like regions with spacing regions being provided therebetween; touch driving electrodes, extending along the first direction and being located within the spacing regions between adjacent strip-like regions; and touch sensing electrodes, extending along a second direction, wherein the first direction is different from the second direction, and when the plurality of grating electrodes are electrified, liquid crystal molecules corresponding to each of the strip-like regions are deflected, and liquid crystal molecules corresponding to each of the spacing regions are not deflected.

18 Claims, 8 Drawing Sheets

(51) Int. Cl.
*G02F 1/1343* (2006.01)
*H04N 13/04* (2006.01)
*G02B 27/22* (2006.01)
*G02F 1/13* (2006.01)
*G06F 3/044* (2006.01)

(56) References Cited

U.S. PATENT DOCUMENTS

| | | | | |
|---|---|---|---|---|
| 2009/0190048 | A1* | 7/2009 | Hong et al. | 349/15 |
| 2010/0001976 | A1* | 1/2010 | Jiang et al. | 345/174 |
| 2010/0194710 | A1* | 8/2010 | Koito et al. | 345/174 |
| 2010/0225612 | A1* | 9/2010 | Ishizaki et al. | 345/174 |
| 2010/0328239 | A1* | 12/2010 | Harada et al. | 345/173 |
| 2012/0218482 | A1* | 8/2012 | Hwang et al. | 349/12 |
| 2013/0077037 | A1* | 3/2013 | Xie et al. | 349/143 |

OTHER PUBLICATIONS

First Chinese Office Action dated Aug. 4, 2014; Appln. No. 201210320605.X.

* cited by examiner

TOUCH LIQUID CRYSTAL GRATING, 3D TOUCH DISPLAY DEVICE AND DRIVING METHOD OF TOUCH LIQUID CRYSTAL GRATING

TECHNICAL FIELD

Embodiments of the present invention relate to a touch liquid crystal grating, a 3D touch display device and a driving method of the touch liquid crystal grating.

BACKGROUND

At present, the 3D (three-dimensional) display technology has attracted a lot of attentions, and its most fundamental principle is: different pictures are received by left and right eyes of a person, respectively, and then are subjected to superimposing, renascence of image information, etc., in a brain, thereby forming a stereoscopic image.

The current 3D display technology is mainly classified into a naked-eye 3D display and a glasses 3D display, and a common naked-eye 3D display technology is to add a layer of liquid crystal grating to a display screen. As shown in FIG. 1, a common liquid crystal grating generally comprises an upper polarizer, a lower polarizer, an upper substrate, a lower substrate and a liquid crystal layer between the two substrates, and strip-like electrodes and a plane electrode are provided on the upper substrate and the lower substrate, respectively. Its specific operation principle is as follows: when the liquid crystal grating is electrified, liquid crystal molecules corresponding to the strip-like electrodes are deflected, and other liquid crystal molecules remain the same. In this case, when a light enters from the lower polarizer, a polarized light parallel to an absorption axis of the lower polarizer enters the liquid crystal layer, will change its vibration direction upon passing through the liquid crystal molecules that remain the same without deflection, and its vibration direction is just parallel to an absorption axis of the upper polarizer when it reaches the upper polarizer, so that the light pass through; while passing through the liquid crystal molecules that are deflected, the polarized light will not change the vibration direction, and its vibration direction is perpendicular to the absorption axis of the upper polarizer when it reaches the upper polarizer, so that the light is blocked. As such, a parallax barrier perpendicular to an extending direction of strip-like electrodes is formed, thereby achieving the three-dimensional grating display mode. In this mode, when an image to he seen by a left eye is displayed on a display screen, a right eye will be sheltered from it by opaque stripes, and likewise, when an image to be seen by the right eye is displayed on the display screen, the left eye will be sheltered from it by opaque stripes. By means of separating left and right pictures, a three-dimensional display effect is realized.

If touch and three-dimensional display functions need to be realized simultaneously, two layers of touch electrodes insulated from each other will generally be added to the upper substrate of the liquid crystal grating. In this case, the liquid crystal grating having a touch function has at least four layers of electrode, and a large number of electrode layers will reduce the transmittance of the whole liquid crystal grating. And, as both the upper and lower substrates are provided with electrodes, a conductive adhesive needs to be used for conduction of a voltage signal, and alignment marks also need to be provided on the two substrate, respectively, so as to be precisely cell-assembled for use, which increases the fabrication cost as well.

SUMMARY

Embodiments of the invention provide a touch liquid crystal grating, a 3D touch display device and a driving method of the touch liquid crystal grating, by which, a touch liquid crystal grating with a high light transmittance and a low fabrication cost is achieved.

According to an embodiment of the invention, there is provided a touch liquid crystal grating, comprising: a first substrate; a second substrate, cell-assembled with the first substrate; and a liquid crystal layer, filled between the first substrate and the second substrate; a plurality of grating electrodes, which are located on a side of the first substrate that faces the liquid crystal layer and extend along a first direction, each of the plurality of grating electrodes being located within each of strip-like regions with spacing regions being provided therebetween; a plurality of touch driving electrodes, which extend along the first direction and are located on the side of the first substrate facing the liquid crystal layer, the touch driving electrodes being located within the spacing regions between adjacent strip-like regions; and a plurality of touch sensing electrodes, which extend along a second direction and are located on a side of the first substrate opposed to the liquid crystal layer, wherein the first direction is different from the second direction, and in a condition that the plurality of grating electrodes are electrified, liquid crystal molecules corresponding to each of the strip-like regions are deflected, and liquid crystal molecules corresponding to each of the spacing regions are not deflected.

According to an embodiment of the invention, there is further provided a 3D display device, comprising: a display device; and a touch liquid crystal grating, disposed at a light exiting side of the display device, the touch liquid crystal grating being the touch liquid crystal grating as stated above.

According to an embodiment of the invention, there is further provided a driving method of the touch liquid crystal grating, comprising: in a condition that the touch liquid crystal grating is in a 3D display mode, for each of grating electrodes, its grating sub-electrodes in odd-numbered rows are applied with a first voltage, and its grating sub-electrodes in even-numbered rows are applied with a second voltage, wherein the first voltage is not equal to the second voltage so that liquid crystal molecules corresponding to each of the grating electrodes are deflected, while each of the touch driving electrodes is applied with the first voltage or the second voltage as one or both of adjacent grating sub-electrodes, and the touch sensing electrodes are applied with a voltage different from that applied to the touch driving electrodes; in a condition that the touch liquid crystal grating is in a 2D display mode, the grating electrodes and the touch driving electrodes of the touch liquid crystal grating are grounded or applied with the same voltage, and the touch sensing electrodes are applied with a voltage different from that applied to the touch driving electrodes.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, a touch liquid crystal grating and a 3D touch display device provided by embodiments of the invention will be described in detail.

Figure 1:
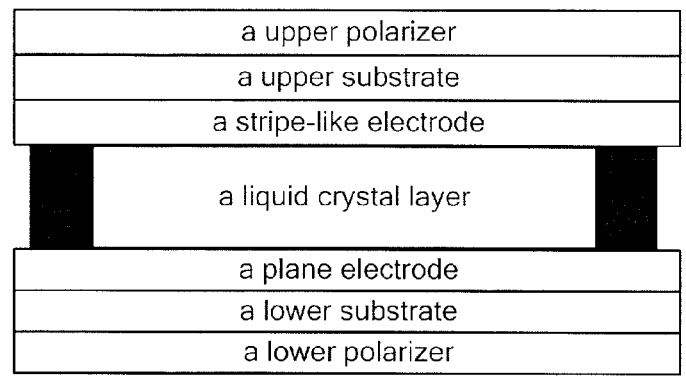
FIG. 1 is a structurally schematic view illustrating a liquid crystal grating in prior art.
Figure 2:
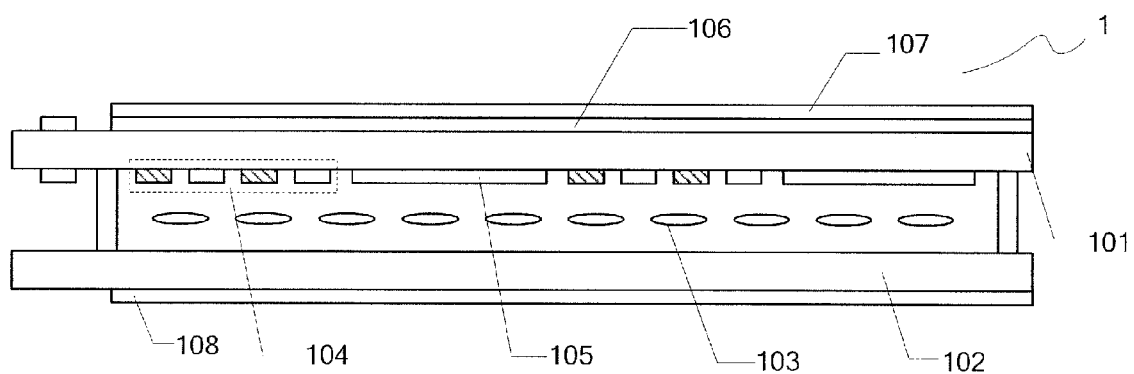
FIG. 2 is a structurally schematic view illustrating a touch liquid crystal grating provided by an embodiment of the invention.

An embodiment of the invention provides a touch liquid crystal grating 1. As shown in FIG. 2, it comprises: a first substrate 101; a second substrate 102, cell-assembled with the first substrate 101; a liquid crystal layer 103, filled between the first substrate 101 and the second substrate 102; a plurality of grating electrodes 104, which are located on a side of the first substrate 101 that faces the liquid crystal layer 103 and extend along a first direction, each of the plurality of grating electrodes 104 being disposed within each of strip-like regions A; a plurality of touch driving electrodes 105, which extend along the first direction and are located on the side of the first substrate 101 that faces the liquid crystal layer 103, each of the plurality of touch driving electrodes 105 being disposed with a spacing region B between adjacent strip-like regions A; and a touch sensing electrode 106, which extends along a second direction and is located on a side of the first substrate 101 opposed to the liquid crystal layer 103, wherein the first direction is different from the second direction, and exemplarily, the first direction is perpendicular to the second direction.

Here, when the plurality of grating electrodes are electrified, liquid crystal molecules corresponding to the plurality of strip-like regions A are deflected, while liquid crystal molecules corresponding to the spacing regions B are not deflected.

Exemplarily, within each of the strip-like regions A, each of the grating electrodes 104 comprises two or more strip-like grating sub-electrodes 1041 that are disposed parallel to each other, and adjacent strip-like grating sub-electrodes 1041 are applied with different voltages so that there is a voltage difference between them.

Exemplarily, within each of the strip-like regions A, the same ones of ends of grating sub-electrodes in odd-numbered rows may be connected together through a wire, and the same ones of ends of grating sub-electrodes in even-numbered rows may be connected together through a wire; alternatively, ones of ends of grating sub-electrodes in odd-numbered rows are connected to a common, external lead terminal through leads, respectively, and ones of ends of grating sub-electrodes in even-numbered rows are connected to a common, external lead terminal through leads, respectively. Accordingly, the same ones of ends of grating sub-electrodes in odd-numbered rows for different grating electrodes are connected together, and grating sub-electrodes in even-numbered rows for different grating electrodes are connected together; or, ones of ends of grating sub-electrodes in odd-numbered rows for different grating electrodes are connected to a common, external lead terminal through leads, respectively, and ones of ends of grating sub-electrodes in even-numbered rows are connected to a common, external lead terminal through leads, respectively; or, within each of grating electrodes, ones of ends of grating sub-electrodes in odd-numbered rows are connected together, and ones of ends of grating sub-electrodes in even-numbered rows are connected together, and for different grating electrodes, their grating sub-electrodes are individually connected to external lead terminals through respective leads.

Optionally, upon specific implementation, an ITO (Indium Tin Oxide) material may be used for formation of the grating electrodes 104, the touch driving electrodes 105 and the touch sensing electrodes 106.

Optionally, as shown in FIG. 2, the touch liquid crystal grating 1 in the embodiment further comprises: a first polarizer 107 located on a side of the touch sensing electrode 106 opposed to the liquid crystal layer 103, and a second polarizer 108 located on a side of the second substrate 102 opposed to the liquid crystal layer 103, directions of transmission axes of the first polarizer 107 and the second polarizer 108 are parallel.

Liquid crystal molecules in the liquid crystal layer 103 are aligned in parallel along the direction of the transmission axis of the first polarizer when no power is applied to them.

Exemplarily, directions of transmission axes of the first polarizer 107 and the second polarizer 108 are arranged to be parallel to each other, and in the event that no power is applied to grating electrodes 104 of the liquid crystal grating, liquid crystal molecules have no delay function on polarized light that pass through it after being transmitted by the second polarizer 108, so that the polarized light passing through the liquid crystal molecules has a polarization direction along the direction of transmission axis of the first polarizer 107. Therefore, a bright field is formed at each of the strip-like regions A and each of the spacer regions B, i.e., the entire touch liquid crystal grating 1 is pervious to light. In the event that power is applied to grating electrodes 104 of the liquid crystal grating, liquid crystal molecules corresponding to the strip-like regions A are deflected to have a delay function on the polarized light that pass through it after being transmitted by the second polarizer 108. Accordingly, the polarized light passing through the liquid crystal molecules have a polarization direction different from the direction of transmission axis of the first polarizer 107 and can not pass through the first polarizer 107, thereby forming a dark field at the strip-like regions A. However, liquid crystal molecules at the spacing regions B are not deflected, so as to form a bright field. The entire touch liquid crystal grating 1 is formed as a grating with alternately bright and dark stripes. As regards the touch liquid crystal grating in the embodiment, by means of controlling a voltage applied to the grating electrodes 104, free conversion between the 2D and 3D displays can be realized.

As can be known by those skilled in the art, when the touch liquid crystal grating provided by the embodiment of the invention is applied to a liquid crystal display device, it is possible that two layers of polarizers at a contact face of the liquid crystal display device and the touch liquid crystal grating as well as the second substrate 102 of the touch liquid crystal grating are omitted, and the first substrate 101 of the touch liquid crystal grating is directly cell-assembled with a color filter substrate of the liquid crystal panel. As such, by means of arranging directions of transmission axes of the first polarizer 107 over the first substrate 101 and a polarizer under a TFT array substrate to be parallel to each other, a function of 3D touch display can also be realized. Its principle is similar to that in the example provided by the embodiment of the invention, and details are omitted here.

Or, when the touch liquid crystal grating provided by the embodiment of the invention is applied to a liquid crystal panel, it is possible that only one layer of polarizer is provided at a contact face of the liquid crystal panel and the touch liquid crystal grating, and the direction of transmission axis of the polarizer is parallel to the direction of transmission axis of the polarizer 107 over the first substrate 101, but is parallel to or perpendicular to the direction of transmission axis of a polarizer provided on an array substrate of the liquid crystal panel.

Figure 3:
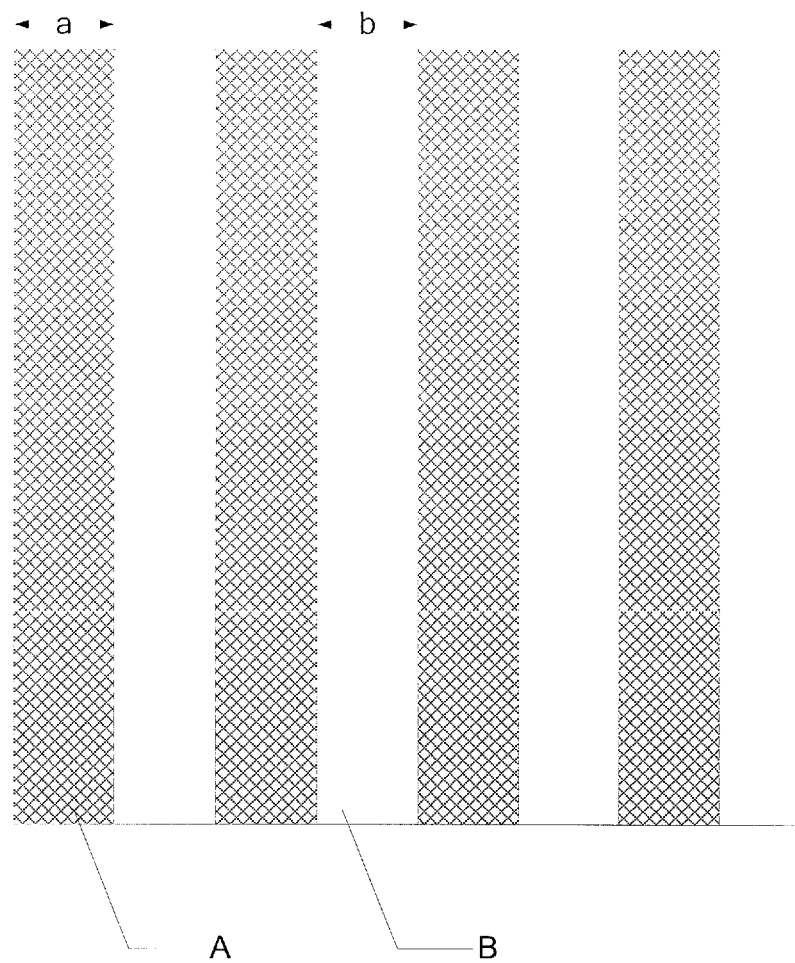
FIG. 3 is a schematic view illustrating strip-like regions and spacing regions of the touch liquid crystal grating provided by an embodiment of the invention.

Exemplarily, as shown in FIG. 3, a width a of the strip-like regions A of the touch liquid crystal grating and a width b of the spacing regions B between adjacent strip-like regions A are the same, and moreover, the width a of the strip-like regions A disposed on the touch liquid crystal grating should be half of the width of a sub-pixel of the display device. Certainly, embodiments of the invention are not limited thereto, and in practice, the width of the strip-like regions and the width of the spacing regions may be determined according to actual circumstances, as long as alternately bright and dark stripes can be formed to realize the 3D display. Furthermore, the relationship between the widths of the strip-like regions and the spacing regions and the width of a sub-pixel unit may also be determined according to actual requirements, as long as the 3D display can be realized.

Figure 4:
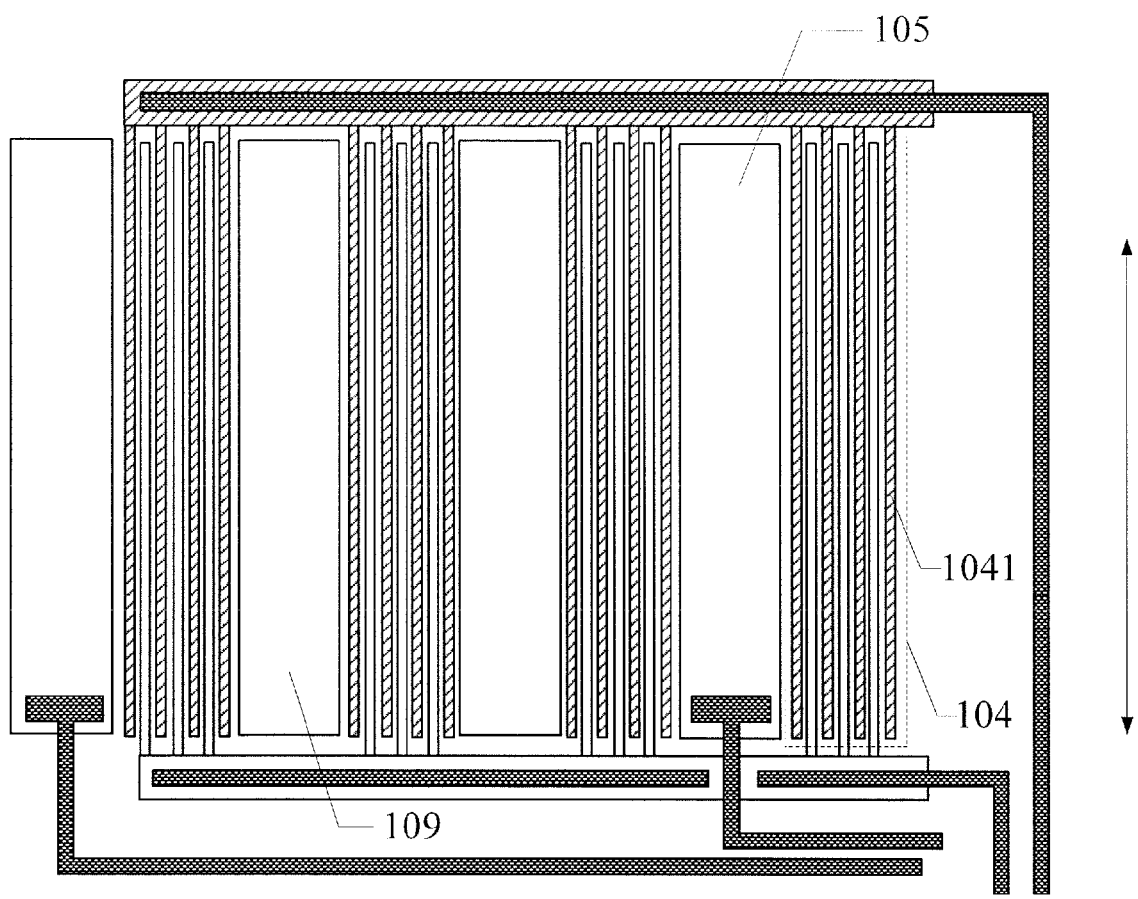
FIG. 4 is a top view illustrating a side of a first substrate facing a liquid crystal layer, provided by an embodiment of the invention.

Exemplarily, as shown in FIG. 4, a grating electrode 104 in the touch liquid crystal grating provided by the embodiment of the invention includes at least two grating sub-electrodes 1041 that are parallel to each other. Description will be made with reference to an example shown in FIG. 4 that each of grating electrodes 104 includes seven grating sub-electrodes 1041, a extending direction of which is the same as the alignment direction (an arrow direction shown in FIG. 4) of liquid crystal molecules without electrified.

In each of grating electrodes 104, the any same ones of ends of grating sub-electrodes 1041 in odd-numbered rows (represented by grating sub-electrodes 1041 with inclined lines in FIG. 4) are connected together through a wire or electrode in the same layer, and the any same ones of ends of grating sub-electrodes 1041 in even-numbered rows (represented by hollowed grating sub-electrodes 1041 in FIG. 4) are connected together through an electrode or an wire in the same layer. When the grating sub-electrodes 1041 are electrified, a potential difference at least exceeding a threshold voltage of liquid crystal molecules is produced between adjacent grating sub-electrodes 1041, and this will enable corresponding liquid crystal molecules to be deflected, thereby achieving the 3D display mode.

In general, a pattern size of a touch electrode is usually in the millimeter level, while a width between barriers for three-dimensional display is usually in the micron level. As can be seen, electrodes necessary for a touch screen are much smaller in number than electrodes necessary for a parallax barrier. Therefore, in the touch liquid crystal grating, the number of touch electrodes is also far smaller than the number of grating electrodes for 3D display. As such, as shown in FIG. 4, according to the desired accuracy of a touch, touch driving electrodes 105 may be provided within a part of the spacing regions B, and in order to adjust the optical matching of the touch liquid crystal grating, Dummy electrodes 109 may be provided within other spacing regions B except those within which the touch driving electrodes 105 have been provided, and the Dummy electrodes 109 are not necessary to be applied with any voltage. In addition, provision of the Dummy electrodes 109 can also raise the Signal to Noise Ratio (SNR) between the touch driving electrodes 105 and the touch sensing electrodes 106, and improve the sensitivity of the touch.

Exemplarily, the grating electrodes 104, the touch driving electrodes 105 and the Dummy electrodes 109 may be disposed in the same layer, namely, they are fabricated in one patterning process, and this can decrease the number of layers in the touch liquid crystal grating, thereby increasing its transmittance.

Further, in order to balance optical matching of the touch liquid crystal grating still more, each of the Dummy electrodes 109 may be composed of at least two strip-like sub-electrodes that are parallel to each other. Specifically, the arranged density of strip-like sub-electrodes may conform to the arranged density of grating sub-electrodes 1041 in a grating electrode 104.

Exemplarily, in order to balance optical matching of the touch liquid crystal grating still more, each of the touch driving electrodes 105 may be composed of at least two touch driving sub-electrodes that are parallel to each other as well, and any ones of ends of the touch driving sub-electrodes constituting one touch driving electrode get conduction through a wire. Specifically, the arranged density of the touch driving sub-electrodes may conform to the arranged density of the grating sub-electrodes 1041 in a grating electrode 104, so as to achieve maximization of optical matching.

Figure 5:
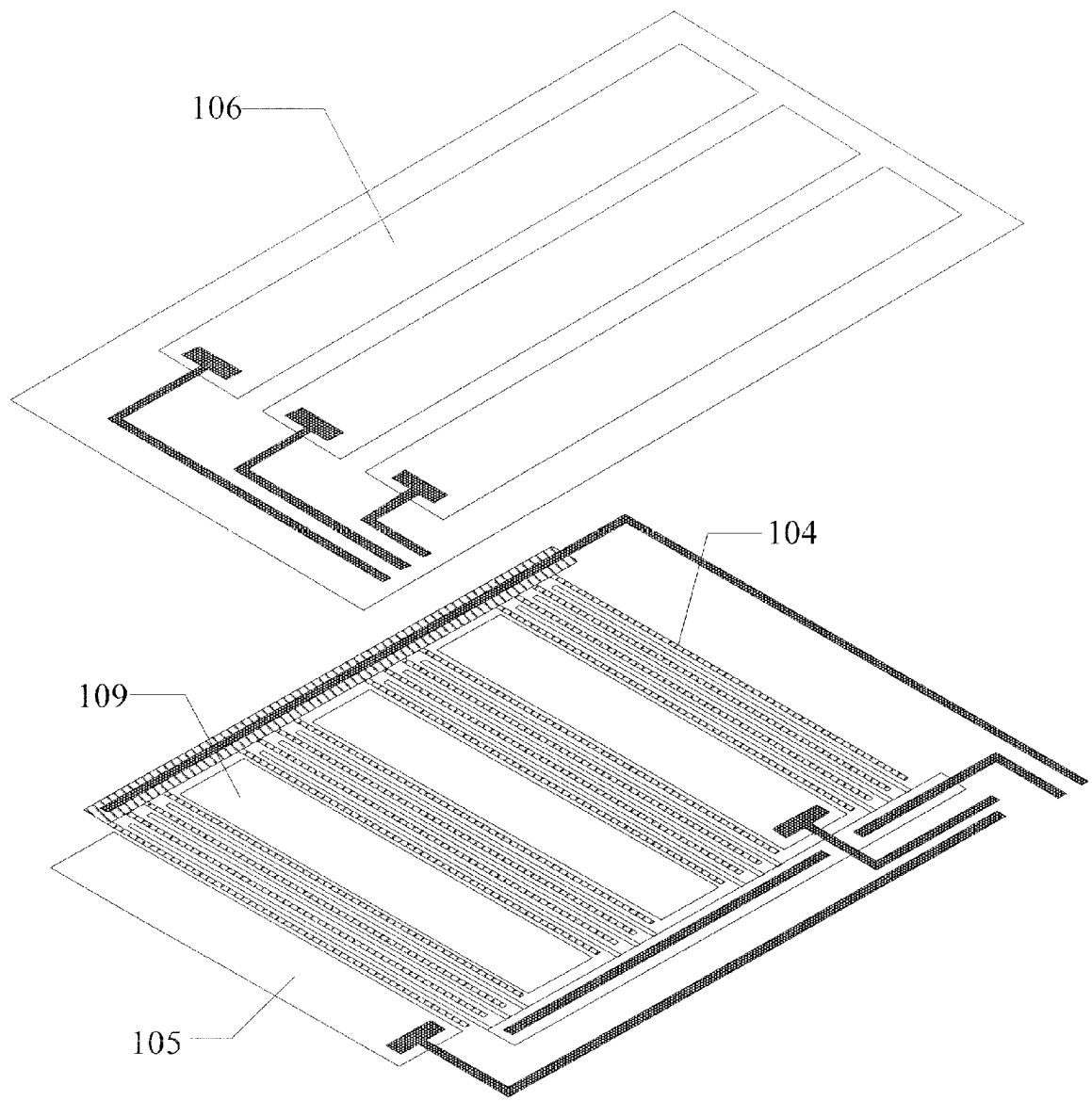
FIG. 5 is a schematically, structurally exploded view illustrating two sides of a first substrate provided by an embodiment of the invention.

When a touch function is realized by the touch liquid crystal grating provided by the embodiment of the invention, double-layered touch electrodes are employed, namely, the touch driving electrodes 105 and the touch sensing electrodes 106 are disposed in two layers, and the first substrate 101 interposed between them serves as an insulating layer. As shown in FIG. 5, a relationship of being non-uniplanar and perpendicular will be usually formed between a touch sensing electrode 106 and a touch driving electrode 105, and a sensing capacitor is formed at the non-uniplanar intersection of the two electrodes. The working process of it is: when a touch driving signal is applied to the touch driving electrode, a voltage signal generated on the touch sensing electrode by coupling of the sensing capacitor is detected; in this course, in a case that a human body contacts with the touch screen, an electric field of the human body will act on the sensing capacitor so that a capacitance of the sensing capacitor is changed, and thus the voltage signal generated on the touch sensing electrode by coupling is changed; in accordance with the change of the voltage signal, a contact position can be determined.

Figure 6:
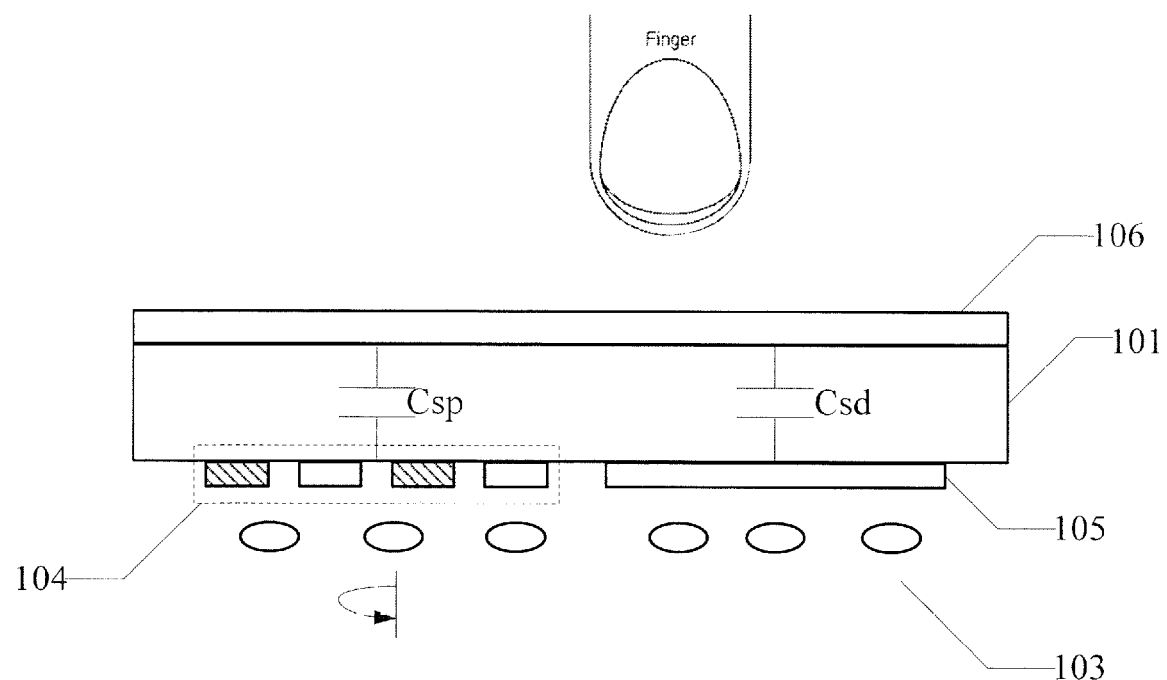
FIG. 6 is a schematic view illustrating a principle of touch and 3D display functions provided by an embodiment of the invention.

In general, when a touch and a 3D display are realized at the same time, a touch signal and a grating display signal will interfere with each other, while in the touch liquid crystal grating provided by the embodiment of the invention, liquid crystal molecules directly under the touch driving electrodes 105 for transmitting the touch signal will not be deflected so that a interference will not occur between the touch signal and the grating display signal. And, as shown in FIG. 6, the touch sensing electrodes 106 for sensing the touch signal are located above the first substrate, and the first substrate 101 functions as an insulating layer between the touch driving electrodes 105 and the touch sensing electrodes 106. Upon specific implementation, the first substrate 101 is usually a glass substrate, which is generally thicker so that a distance between the touch sensing electrode 106 and the grating electrode 104 can be increased. This allows a capacitance Csp produced between the two to make a minimal impact on liquid crystal molecules disposed under the grating electrode 104, or even to make no impact on a deflection direction of liquid crystal molecules essentially. Therefore, the 3D display and touch functions can be better achieved by the touch liquid crystal grating provided by the embodiment of the invention simultaneously.

Figure 7:
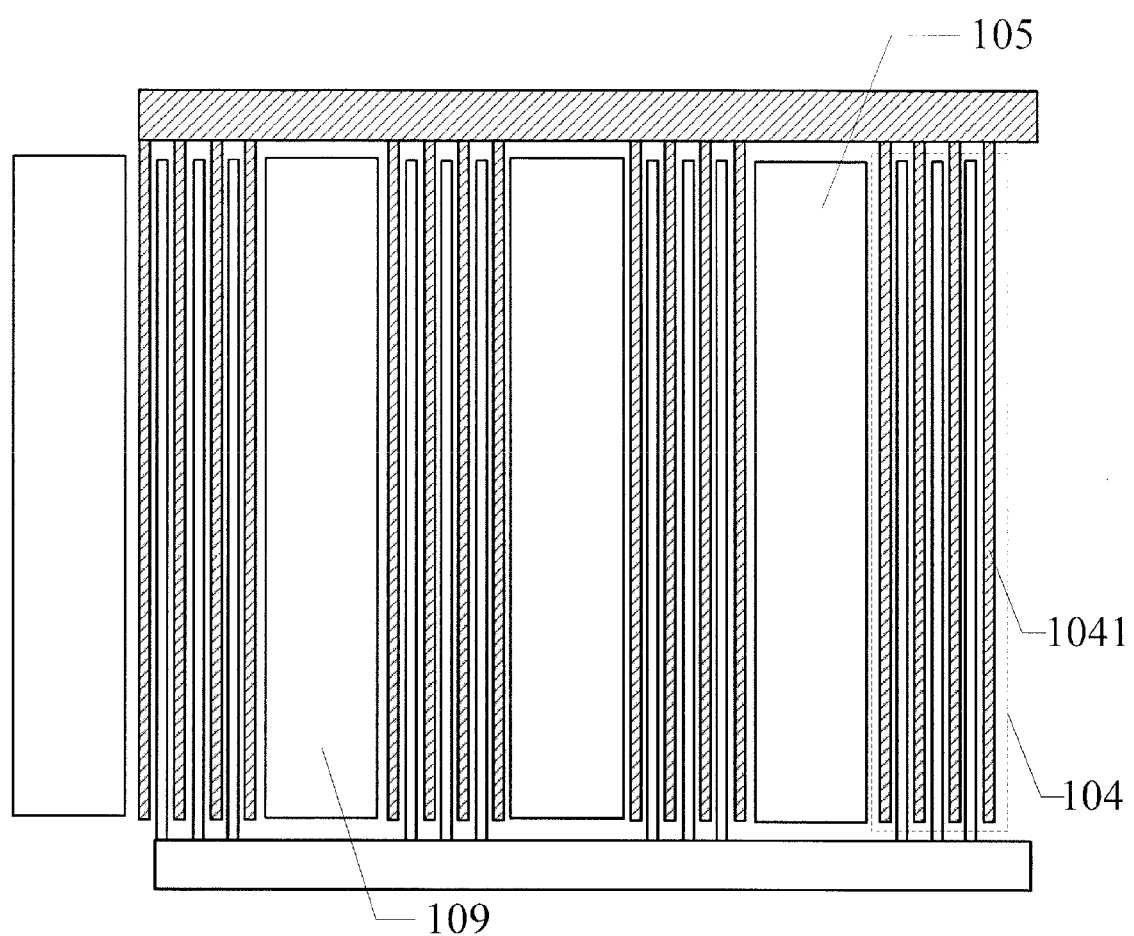
FIG. 7 to FIG. 9 are schematic views illustrating various steps upon manufacture of the side of the first substrate that faces the liquid crystal layer, provided by an embodiment of the invention.

As for the touch liquid crystal grating provided by the embodiment of the invention, a manufacture process of one side of its upper substrate 101 that faces the liquid crystal layer 103 may comprise several steps as follows:

Firstly, grating electrodes 104, touch driving electrodes 105 and Dummy electrodes 109 are fabricated on the first substrate 101 through one patterning process, as shown in FIG. 7.

Figure 8:
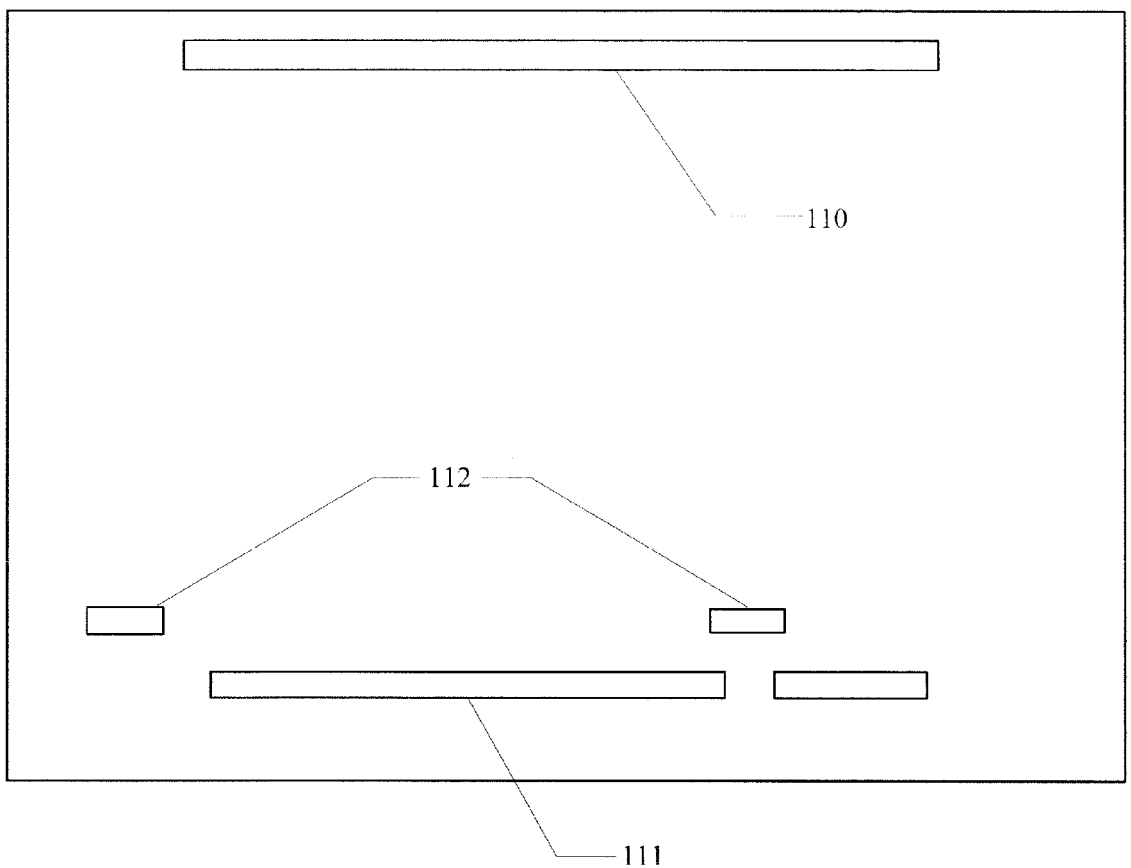

Next, an insulating layer is fabricated on the first substrate 101, which needs to be etched to form a via hole. As shown in FIG. 8, the via hole specifically comprises a via hole 110 through which grating sub-electrodes 1041 in odd-numbered rows get conduction, a via hole 111 through which grating sub-electrodes 1041 in even-numbered rows get conduction, and a via hole 112 through which the touch driving electrodes 105 get conduction.

Figure 9:
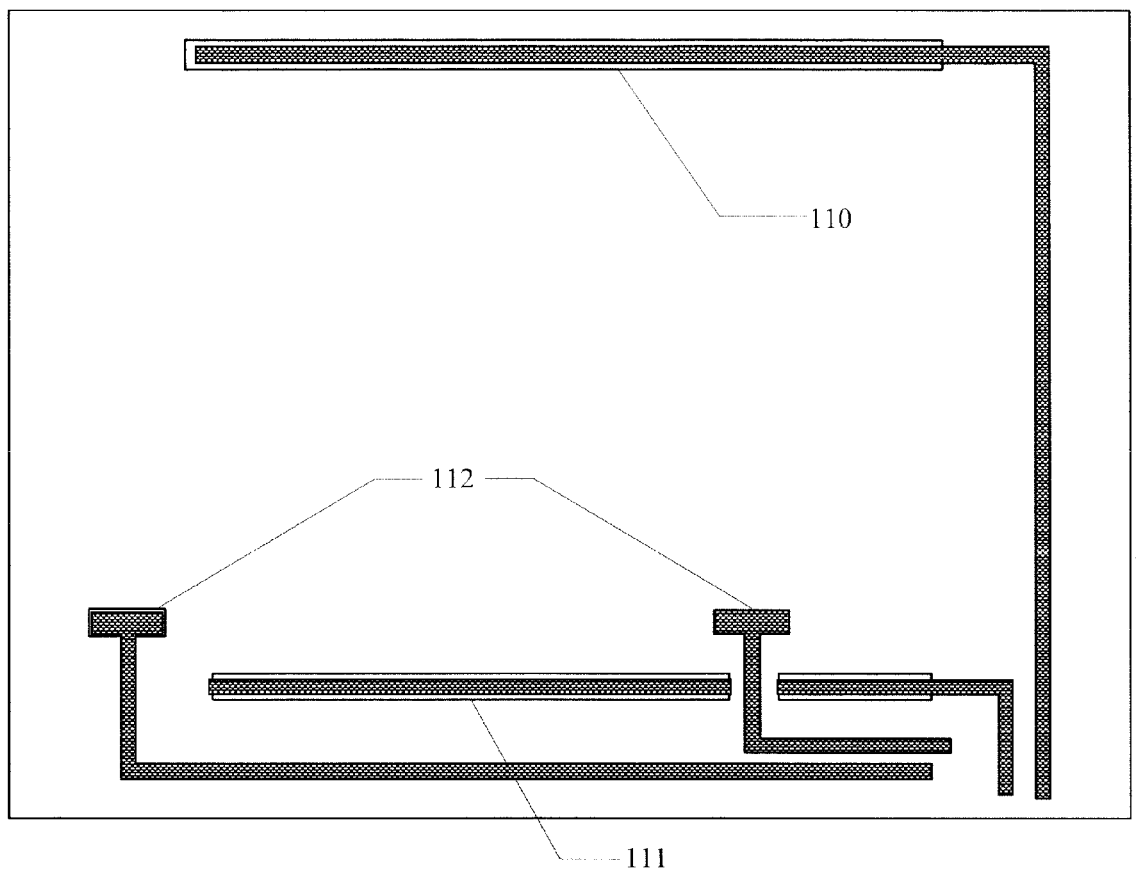

Finally, a metal wiring is formed on the insulating layer, as shown in FIG. 9. As can be seen, because the resistance of the metal wiring is far lower than the resistance of an ITO electrode, in addition to the function of conduction, the metal wiring positioned in the via hole 110 through which the grating sub-electrodes 1041 in odd-numbered rows get conduction and the via hole 111 through which the grating sub-electrodes 1041 in even-numbered rows get conduction can also play a function of reducing a resistance of the grating sub-electrodes 1041. Thus, the voltage loss is reduced.

Similarly, a manufacture process of one side of the upper substrate 101 that is opposed to the liquid crystal layer 103 may comprise three steps of fabricating a metal wiring, fabricating touch sensing electrodes 106 and coating an insulating protection layer, and details are omitted here.

According to an embodiment of the invention, there is further provided a driving method of the above touch liquid crystal grating, comprising:

when the touch liquid crystal grating is in a 3D display mode, grating sub-electrodes in odd-numbered rows that are included in a grating electrode disposed in each of strip-like regions A are applied with a first voltage, and grating sub-electrodes in even-numbered rows that are included in it are applied with a second voltage, wherein the first voltage is not equal to the second voltage so that liquid crystal molecules corresponding to each grating electrode are deflected. While each of touch driving electrodes is applied with the first voltage or the second voltage as one or both of adjacent grating sub-electrodes, and each of touch sensing electrodes is applied with a voltage different from the first voltage and the second voltage. Thus, a touch function can be realized while the 3D display is achieved.

When the touch liquid crystal grating is in a 2D display mode, the grating electrodes and the touch driving electrodes of the touch liquid crystal grating are grounded or applied with the same voltage so that liquid crystal molecules corresponding to the grating electrodes are not deflected, and the touch sensing electrodes are applied with a voltage different from that applied to the touch driving electrodes, so as to realize the touch function. It is to be noted, applying the same voltage to grating electrodes of the touch liquid crystal grating means that the same voltage is applied to grating sub-electrodes in odd-numbered rows and grating sub-electrodes in even-numbered rows of each grating electrode so as not to produce a voltage difference between the two.

Based on the unified inventive concept, an embodiment of the invention further provides a 3D touch display device, comprising a display device and a liquid crystal grating disposed on a light exiting face of the display device, the liquid crystal grating being the above touch liquid crystal grating provided by the embodiment of the invention.

Specifically, the display device may be a liquid crystal display device (LCD), an organic electroluminescent display device (OLED), a plasma display device (PDP), a cathode ray display device (CRT), or the like.

One example of the display device is a liquid crystal display device, wherein the TFT array substrate and an opposite substrate are disposed to face each other to form a liquid crystal cell, and a liquid crystal material is filled in the liquid crystal cell. The opposite substrate is a color filter substrate, for example. A pixel electrode of each pixel unit of the TFT array substrate is used to apply an electric field, so as to control a rotation of the liquid crystal material and to perform a displaying operation. In some examples, the liquid crystal display device further comprises a backlight source provided for the display device.

Another example of the display device is an organic light emitting display (OLED) device, wherein a pixel electrode of each pixel unit of the TFT array substrate is used as an anode or a cathode to drive an organic light-emitting material to emit light so as to perform a displaying operation.

With respect to the touch liquid crystal grating, its driving method and the 3D touch display device provided by embodiments of the invention, grating electrodes are provided within strip-like regions on a side of the first substrate facing the liquid crystal layer and with spacing regions provided between each other, and a grating electrode within each of the strip-like regions comprises a plurality of strip-like grating sub-electrodes, with touch driving electrodes being provided within spacing regions between adjacent strip-like regions; on a side of the first substrate opposed to the liquid crystal layer are provided touch sensing electrodes having different extending direction from the touch driving electrodes; when power is applied to a grating electrode, an electric field can be generated to make corresponding liquid crystal molecules be deflected, so that a strip-like grating is formed, and a touch function can be realized with the use of the touch driving electrodes and touch sensing electrodes that are insulated by the first substrate. Because the strip-like grating can be formed merely by forming a layer of grating electrodes on the first substrate, the number of electrode layer is decreased, and the transmittance of the whole liquid crystal grating is enhanced; furthermore, because both the touch electrodes and the grating electrodes are provided on the first substrate, it is unnecessary to use a conductive adhesive for conduction of a voltage signal, and to arrange an alignment mark on the second substrate as well, whereby the fabrication process is simplified, and the production cost is saved.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A touch liquid crystal grating, comprising:
a first substrate;
a second substrate, cell-assembled with the first substrate; and
a liquid crystal layer, filled between the first substrate and the second substrate; a plurality of grating electrodes, which are located on a side of the first substrate that faces the liquid crystal layer and extend along a first direction, each of the plurality of grating electrodes being located within each of strip-like regions with spacing regions being provided therebetween;
a plurality of touch driving electrodes, which extend along the first direction and are located on the side of the first substrate facing the liquid crystal layer, the touch driving electrodes being located within the spacing regions between adjacent strip-like regions; and
a plurality of touch sensing electrodes, which extend along a second direction and are located on a side of the first substrate opposed to the liquid crystal layer,
wherein the first direction is different from the second direction, and in a condition that the plurality of grating electrodes are electrified, liquid crystal molecules corresponding to each of the strip-like regions are deflected, and liquid crystal molecules corresponding to each of the spacing regions are not deflected,
wherein the grating electrode within each of the strip-like regions comprises two or more strip-like grating sub-electrodes disposed parallel to each other,
wherein for each of the grating electrodes, ones of ends of the grating sub-electrodes in odd-numbered rows are connected together through a first wire, and ones of ends of the grating sub-electrodes in even-numbered rows are connected together through a second wire; alternatively, for each of the grating electrodes, ones of ends of the grating sub-electrodes in odd-numbered rows are connected to a first common, external lead terminal through lead-wires, respectively, and ones of ends of the grating sub-electrodes in even-numbered rows are connected to a second common, external lead terminal through lead-wires, respectively.

2. The touch liquid crystal grating claimed as claim 1, wherein in a condition that the touch liquid crystal grating operates in a 3D mode, adjacent strip-like grating sub-electrodes of each of the grating electrode are applied with different voltages so that there is a potential difference at least exceeding a threshold voltage of the liquid crystal molecules between the adjacent strip-like grating sub-electrodes of each of the grating electrode.

3. The touch liquid crystal grating claimed as claim 1, wherein a width of each of the strip-like regions is the same as a width of each of the spacing regions between adjacent strip-like regions.

4. The touch liquid crystal grating claimed as claim 1, further comprising: a plurality of Dummy electrodes which are located on the side of the first substrate facing the liquid crystal layer, each of the plurality of Dummy electrodes being positioned within each of other spacing regions except those within which the touch driving electrodes are provided.

5. The touch liquid crystal grating claimed as claim 4, wherein each of the Dummy electrodes is composed of at least two strip-like sub-electrodes that are parallel to each other.

6. The touch liquid crystal grating claimed as claim 4, wherein the plurality of grating electrodes, the touch driving electrodes and the Dummy electrodes are disposed in the same layer.

7. The touch liquid crystal grating claimed as claim 1, wherein the first direction is perpendicular to the second direction.

8. The touch liquid crystal grating claimed as claim 1, wherein each of the touch driving electrodes is composed of at least two touch driving sub-electrodes that are parallel to each other, and any ones of ends of the touch driving sub-electrodes constituting one touch driving electrode get conduction through connection of a wire in the same layer.

9. The touch liquid crystal grating claimed as claim 1, wherein an extending direction of each of the grating sub-electrodes is the same as an alignment direction of the liquid crystal molecules when no power is applied to them.

10. The touch liquid crystal grating claimed as claim 1, further comprising. a first polarizer located on a side of the touch sensing electrodes opposed to the liquid crystal layer, and a second polarizer located on a side of the second substrate opposed to the liquid crystal layer, directions of transmission axes of the first polarizer and the second polarizer are parallel to each other.

11. The touch liquid crystal grating claimed as claim 2, wherein in a condition that the touch liquid crystal grating operates in a 3D mode, each of the touch driving electrodes is applied with the same voltage as one or both of adjacent grating sub-electrodes, and the touch sensing electrodes are applied with a voltage different from that applied to the touch driving electrodes.

12. The touch liquid crystal grating claimed as claim 1, wherein in a condition that the touch liquid crystal grating operates in a 2D mode, grating electrodes and touch driving electrodes of the touch liquid crystal grating are grounded or applied with the same voltage, and the touch sensing electrodes are applied with a voltage different from that applied to the touch driving electrodes.

13. A driving method of the touch liquid crystal grating claimed as claim 1, comprising:
in a condition that the touch liquid crystal grating is in a 3D display mode, for each of grating electrodes, its grating sub-electrodes in odd-numbered rows are applied with a first voltage, and its grating sub-electrodes in even-numbered rows are applied with a second voltage, wherein the first voltage is not equal to the second voltage so that liquid crystal molecules corresponding to each of the grating electrodes are deflected, while each of the touch driving electrodes is applied with the first voltage or the second voltage as one or both of adjacent grating sub-electrodes, and the touch sensing electrodes are applied with a voltage different from that applied to the touch driving electrodes;
in a condition that the touch liquid crystal grating is in a 2D display mode, the grating electrodes and the touch driving electrodes of the touch liquid crystal grating are grounded or applied with the same voltage, and the touch sensing electrodes are applied with a voltage different from that applied to the touch driving electrodes.

14. A 3D touch display device, comprising:
a display device; and
a touch liquid crystal grating, disposed at a light exiting side of the display device, the touch liquid crystal grating being the touch liquid crystal grating claimed as claim 1.

15. The 3D touch display device claimed as claim 14, wherein the display device is a liquid crystal display device, and the liquid crystal display device comprises an array substrate and a counter substrate that are disposed in opposition to each other to form a liquid crystal cell and a liquid crystal material filled in the liquid crystal cell.

16. The 3D touch display device claimed as claim 15, wherein the display device further comprises a first polarizer disposed on a side of the array substrate opposed to the liquid crystal material, at a contact face of the counter substrate and the touch liquid crystal grating is provided a second polarizer, and at a side of the second substrate of the touch liquid crystal grating opposed to the liquid crystal layer is provided a third polarizer.

17. The 3D touch display device claimed as claim 15, wherein the second substrate of the touch liquid crystal grating functions as a counter substrate of the display device.

18. The 3D touch display device claimed as claim 16, wherein directions of transmission axes of the first polarizer and the second polarizer are parallel or perpendicular, and directions of transmission axes of the second polarizer and the third polarizer are parallel.

* * * * *